Nov. 6, 1962  D. R. GRAY  3,062,249
SINGLE PASS LOG SAWING MACHINE
Filed April 3, 1961  7 Sheets-Sheet 1

INVENTOR.
DAVID R. GRAY
BY
*Wells & St. John*
ATTYS.

Nov. 6, 1962

D. R. GRAY 3,062,249

SINGLE PASS LOG SAWING MACHINE

Filed April 3, 1961

INVENTOR.
DAVID R. GRAY
BY
Wells & St. John
ATTYS.

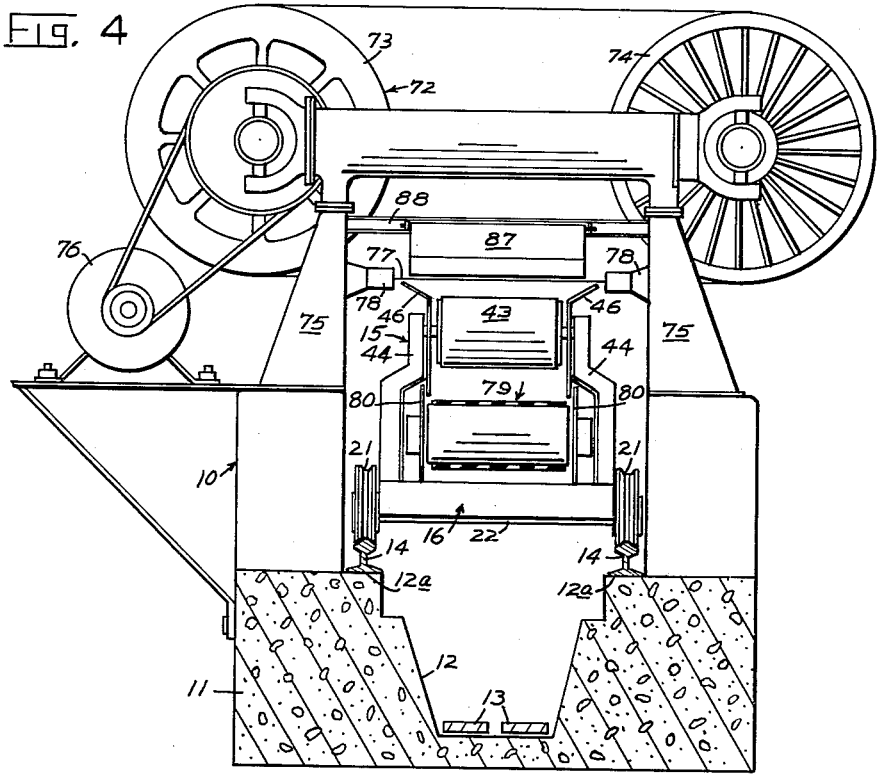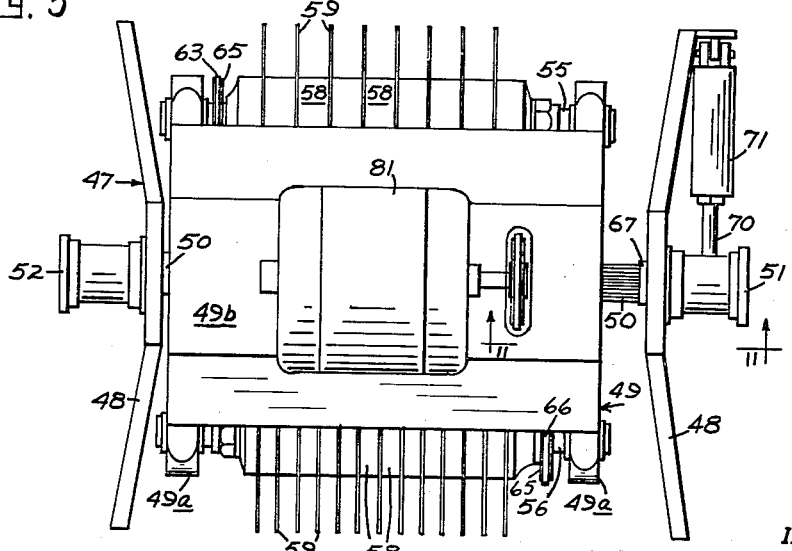

Nov. 6, 1962 D. R. GRAY 3,062,249
SINGLE PASS LOG SAWING MACHINE
Filed April 3, 1961 7 Sheets-Sheet 4
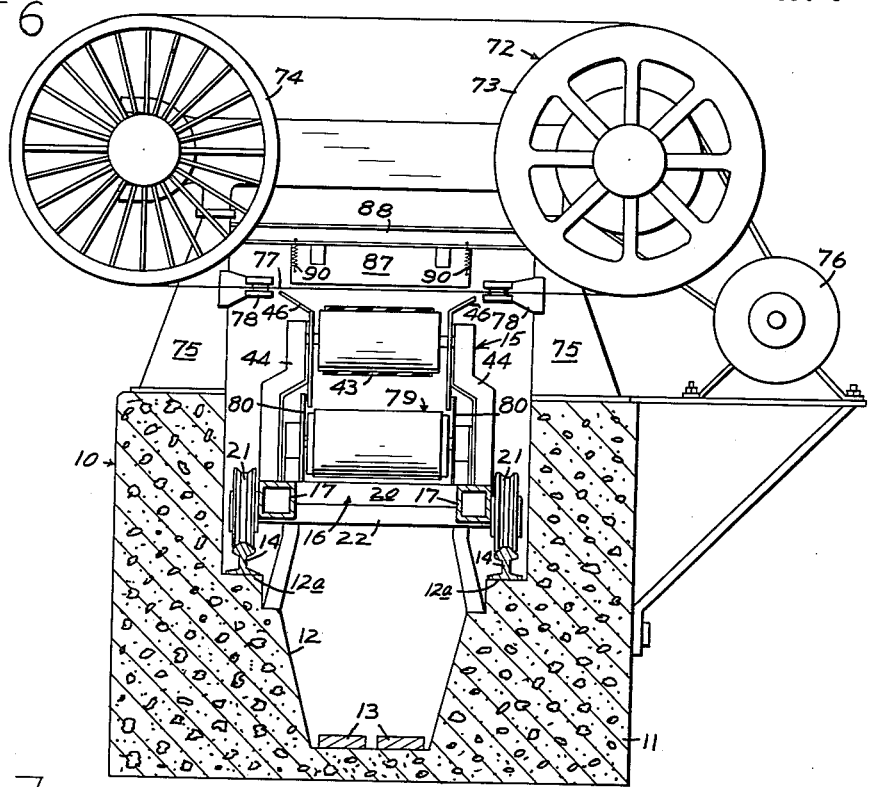
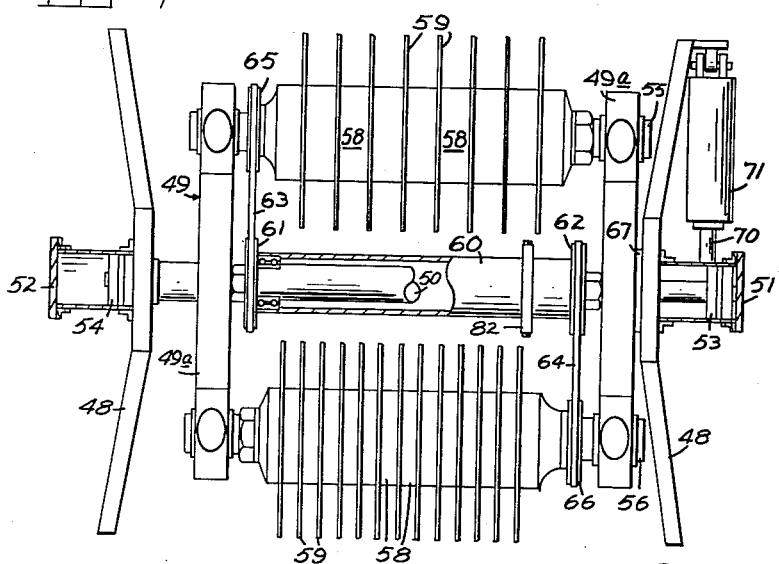
INVENTOR.
DAVID R. GRAY
BY
Wells & St. John
ATTYS.

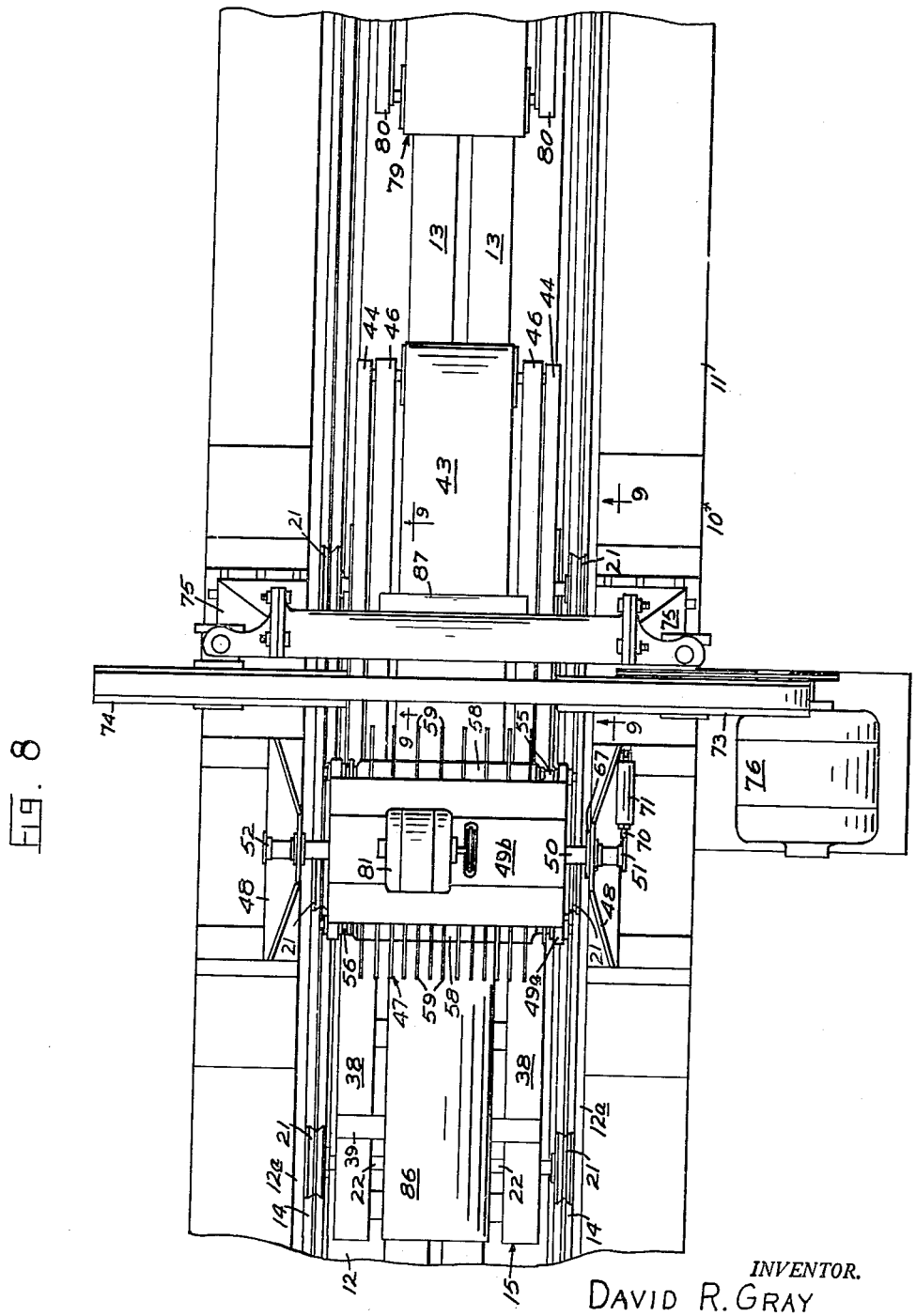

Nov. 6, 1962 D. R. GRAY 3,062,249
SINGLE PASS LOG SAWING MACHINE
Filed April 3, 1961 7 Sheets-Sheet 6

INVENTOR.
DAVID R. GRAY
BY
Wells & St.John
ATTYS.

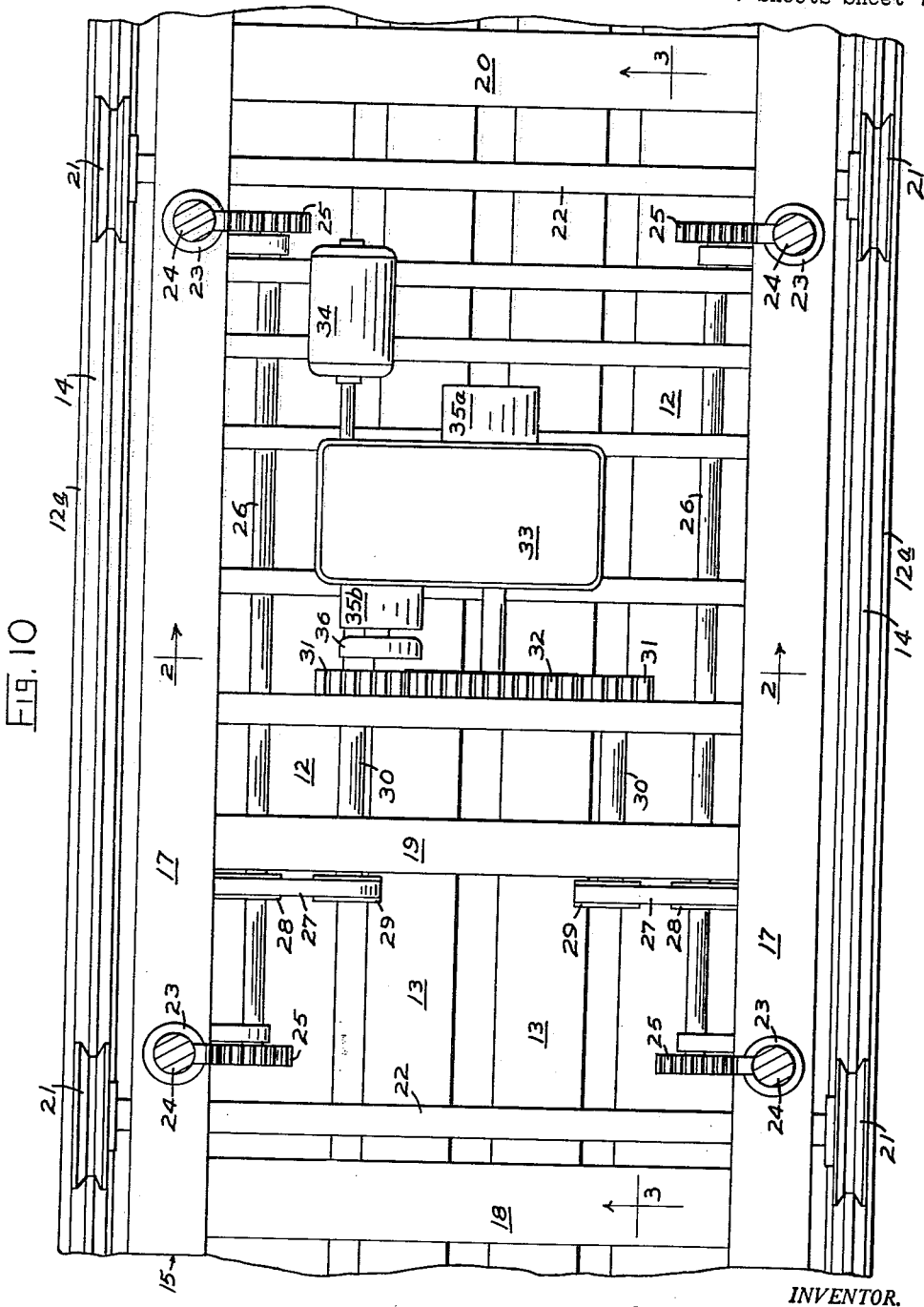

United States Patent Office 3,062,249
Patented Nov. 6, 1962

3,062,249
SINGLE PASS LOG SAWING MACHINE
David R. Gray, E. 726 20th, Spokane 35, Wash.
Filed Apr. 3, 1961, Ser. No. 100,320
6 Claims. (Cl. 143—1)

This invention relates to a novel single pass log sawing machine for preparing dimension lumber.

Under present procedures dimension lumber is cut from raw logs, using several steps. First slabs are cut from the logs along vertical planes. The slabs are then resawed by an edger to produce boards of the desired width. Under such a process the slabs and boards must be conveyed from one machine to another which entails the use of considerable floor space and a bulky machine arrangement. Under the present invention a single mill is contemplated which will produce dimension lumber in a single step directly from the raw logs. This is accomplished by mounting the log on a reciprocable carriage and by passing this carriage and log under an edger and a horizontal band saw. The combined action of the edger and the horizontal band saw forms the dimension lumber as desired. As the carriage is reversed to return it to its normal starting position, the cut lumber is stripped from the top of the remaining log.

It is a first object of this invention to provide a log sawing machine which is simple in construction and which can automatically produce desired lumber from a raw log in a single machining operation. No conveying of cut slabs or lumber is necessary except for the final delivery of the sawn lumber from this machine.

It is another object of this invention to provide such a machine which can be adjusted to accommodate varying sizes of logs and which can be set to produce any one of several available cuts, depending upon which cut is desired.

These and further objects will be evident from a study of the following disclosure, taken in conjunction with the accompanying drawings which illustrate one preferred form of the invention. It is to be understood that this form is exemplary of the many forms suitable for use in this sawmill and that many of the conventional elements utilized in this mill are merely generally shown. The invention itself is to be limited only by the claims which follow this disclosure.

In the drawings:

FIGURE 4 is a vertical sectional view taken along line 4—4 in FIGURE 1;

FIGURE 5 is a top view of the edger assembly;

FIGURE 6 is a sectional view taken along line 6—6 of FIGURE 1;

FIGURE 7 is a view similar to FIGURE 5 with portions of the edger assembly shown in section and with the edger drive motor removed;

FIGURE 8 is a top view of the log sawing machine;

FIGURE 10 is an enlarged sectional view taken along line 10—10 in FIGURE 3; and

Figure 1:
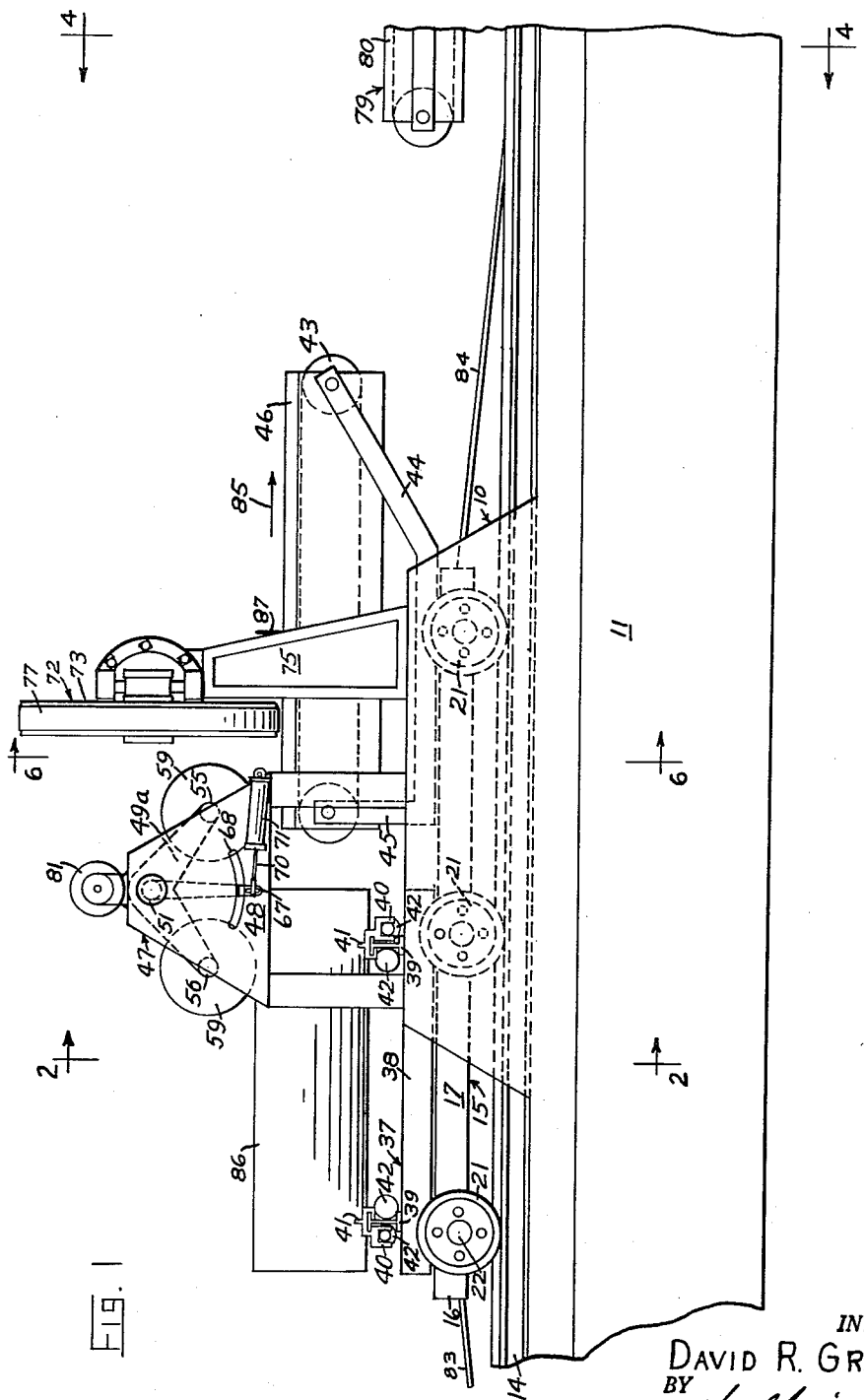
FIGURE 1 is a side view of the complete log sawing machine with the left hand end of the supporting framework broken off, with the right hand end of the framework and final conveyor also broken off and with the resaw motor deleted.
Figure 2:
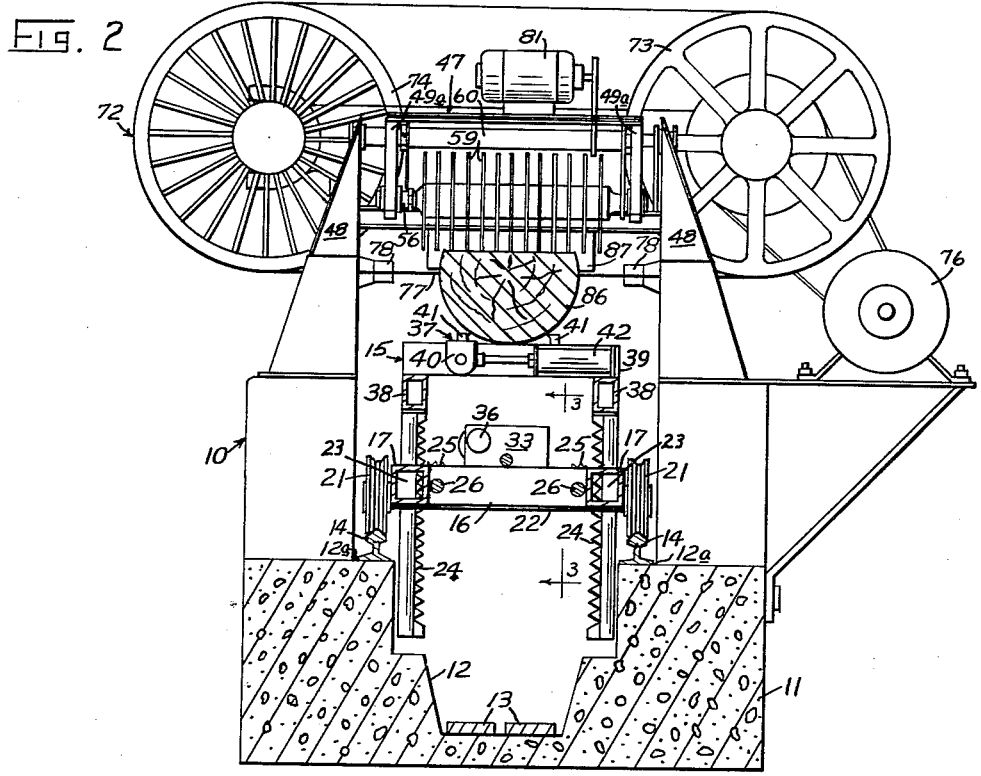
FIGURE 2 is a vertical sectional view taken along the line 2—2 shown in FIGURE 1 and in FIGURE 10.

Referring now to the drawings, the over all assembly of the machine is best seen in FIGURES 1, 2, 4, 6 and 8. The machine is designed to be placed upon a concrete slab foundation 11 which is the base of the fixed framework generally denoted as 10. The foundation 11 includes a recessed pit 12, having wall contours necessary to provide the desired clearance for the machinery moving above it. At the bottom of pit 12 is a scrap conveyor 13, designed to move sawdust and other scraps from the area under the machinery. The pit 12 includes two horizontal ledges 12a on which are fixed a pair of parallel rails 14.

Mounted on the rails 14 is a carriage 15. The carriage 15 consists of a vertically fixed frame 16, having longitudinal sides 17, joined by three transverse I-beams 18, 19 and 20. The sides 17 rotatably support three axles 22, having wheels 21 mounted thereon. The wheels 21 ride along the top of the rails 14.

Mounted within the sides 17 are four slide bearings 23 which slidably support four vertical racks 24. The gear teeth on the racks 24 mesh with pinions 25 (FIGURE 10), fixed to longitudinal shafts 26. The shafts 26 are suitably mounted along the longitudinal sides 17 of the frame 16. The two shafts 26 are driven by chains and sprockets 28, fixed to the shafts 26. The sprockets 28 in turn are driven by chains 27 and pulleys 29 which are fixed to idler shafts 30. The shafts 30 are suitably journalled on the I-beam 19. At the ends of shaft 30 opposite to the sprockets 29, are two gears 31 which are in mesh with the central driving gear 32 of the transmission 33. The transmission 33 is driven by an electric motor 34 and is controlled by a brake 36 and forward and reverse set of clutches 35a and 35b. The driving mechanism for the pinions 25 is a conventional set works electrically controlled and will not be further described in this application. Any other equivalent set works drive may be substituted in the place of the elements 33 through 36. By use of chains, sprockets and gears the racks are locked together.

Figure 3:
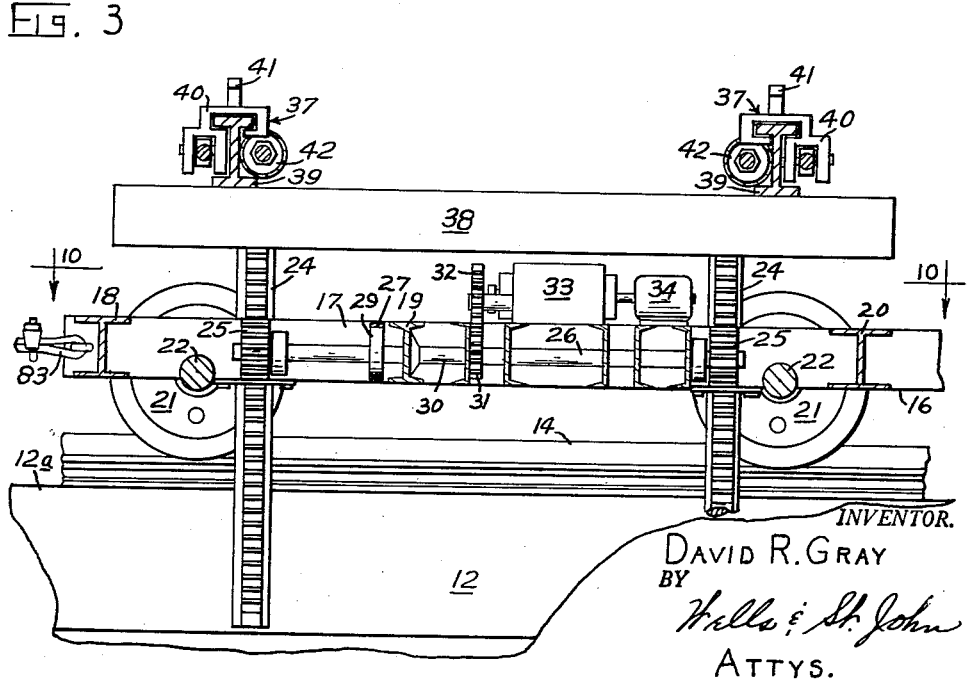
FIGURE 3 is an enlarged sectional view taken along line 3—3 shown in FIGURE 2 and in FIGURE 10.

A log engaging assembly 37 (FIGURES 2 and 3) is mounted at the top end of the vertical racks 24. Assembly 37 has a frame consisting of two parallel side members 38 which have fixed thereto a pair of transverse I-beams 39. As seen in FIGURE 3, the I-beams 39 are mounted across the top edges of the side members 38. Slidably mounted on the top flange of each I-beam 39 are two dog supports 40, which have upwardly extending dogs 41 formed thereon. The supports 40 are moved by the respective reciprocable piston rods of a pair of actuating cylinders 42, fixed to the webs of the respective I-beams 39. Each cylinder 42 is a double acting air cylinder. The piston rods of the cylinders 42 are all interrelated so as to move simultaneously inward or outward. A suitable hydraulic or pneumatic control system, utilizing flow equalizer valves connected to the several cylinders 42 may be used to accomplish this simultaneous motion. The dogs 41 have wedged lower surfaces designed to pull a log resting on the I-beams 39 in a downward position while tending to center the log between the two dogs 41 on each I-beam 39. Thus the dog assembly 37 both grips the log resting thereon and also centers the log on the carriage 15.

Also mounted on the carriage 15 is a discharge conveyor 43 (FIGURES 6 and 8). This conveyor is a conventional belt conveyor of the type used in sawmills. The conveyor may be of any desirable type so long as it is an endless conveyor having a top flight which can be moved in the desired direction. As shown in the drawings (FIGURE 1) the conveyor 43 is carried by front and rear supports 44 and 45. The conveyor 43 has two side guides 46 fixed between the supports 44 and 45 to aid in the control of cut lumber placed on the conveyor 43. The contour of these guides 46 can best be seen in FIGURES 4 and 6.

Mounted above the foundation 11 and fixed thereto is an edger assembly generally denoted as 47 (FIGURES 1, 5, 7 and 8). The assembly 47 consists of a fixed frame 48, having two side members which are securely bolted to the top of the foundation 11. The edger assembly 47 straddles the open top area of the foundation 11. The edger saws are carried on a pivot rack 49 which consists of two vertical side members 49a and a cover 49b which doubles as both a structural element and a shield above the edger saws. Rack 49 is pivotally mounted between the frame members 48 by means of a pivot shaft 50, which is rotatably journalled within the frame 48 and which extends through frame 48 and terminates at each end in pistons 53 and 54 of two end cylinders 51 and 52 respectively. The cylinders 51 and 52 are double acting hydraulic cylinders designed to alternately push the pivot shaft 50 in opposite directions while keeping it parallel to its axis. By controlling the fluid supply to the cylinders 51 and 52 the position of the rack 49 mounted to frame 48 may be varied a total distance equal to the clearance between the frame and rack members.

Rotatably mounted on the lower ends of the rack sides 49a are two arbors 55 and 56. Mounted on the arbors 55 and 56 are a plurality of spaced vertical saws 59 which are spaced by suitable spacers 58. The spacing of the saws on each arbor 55 or 56 is different. In the case of a stud mill designed to produce two by fours, the spacing of the saws on arbor 56 would be two inches, while the spacing of the saws on arbor 55 would be four inches. Also the total movement of rack 49 relative to frame 48 will be four inches in order to accommodate any saw placement desired on a particular log. Thus by manipulation of the cylinders 51 and 52, a sawyer may place the saws 59 at any desired position across the log. The arbors 55 and 56 are driven from an idler tubular shaft 60 which is rotatably journaled on the pivot shaft 50. At each end of the shaft 60 is a driving pulley 61 and 62. Pulley 61 drives a belt 63 and a driven pulley 65 on arbor 55. Likewise the pulley 62 drives a belt 64 and a driven pulley 66 on the arbor 56. The shaft 60 is driven by an intermediate pulley 82 and a motor 81, mounted on the rack 49 above the shafts 50 and 60. Thus the motor 81 will drive each arbor 55 and 56 in the same desired direction.

Figure 11:
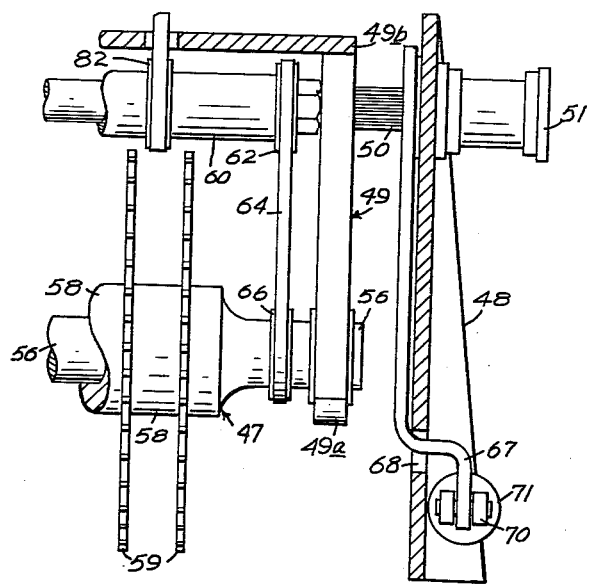
FIGURE 11 (Sheet 6) is an enlarged sectional view taken along line 11—11 in FIGURE 5.

In order to selectively lower one or the other of the arbors 55 and 56 a tilt arm 67 is splined to the shaft 50, as seen in FIGURE 11. The arm 67 bisects the member 49a. It is curved outwardly to extend through a slot 68, cut through the right hand frame member of the frame 48. The slot 68 is formed in an arc in order to accommodate motion of the arm 67 about the axis of shaft 50. The arm 67 has a vertical slot cut therethrough which is pivotally joined to a piston rod 70 of a suitable double acting hydraulic cylinder assembly 71 which is pivotally mounted on the frame 48. As can be seen in FIGURE 1, proper positioning of the saw 57 on either arbor 55 or 56 can be accomplished by rocking the shaft 50 about its axis under the influence of the hydraulic cylinder assembly 71.

Adjacent the edger assembly 47, at the forward end thereof in the direction of the movement of logs during the sawing operation, is a band saw 72 (FIGURES 1, 2, 4 and 6). This band saw 72 is a conventional saw assembly such as used today in horizontal resaws. The saw has two rotatable wheels 73 and 74. The driving wheel 73 is driven by a suitable motor 76. The entire assembly is supported upon pedestals 75, mounted on the foundation 11. The band saw 72 includes a lower cutting run 77, which is held in a plane position by a conventional guide 78. At the far right hand end of FIGURE 1 is seen a receiving conveyor 79. This is a conventional conveyor used to carry the cut lumber to a planer or other operating machine. The conveyor 79 is an endless conveyor and has side guides 80 designed to limit sideward movement of boards on the upper flight of the conveyor 79.

These side guides 80 can best be seen in FIGURES 4 and 6. They are vertical guides and fit within the bent contour of the supports 44 and 45 of the discharge conveyor 43. The conveyor 43 can thus slide over the conveyor 79 during the sawing operation.

The controls for this machine are not shown in detail. Any suitable conventional controls may be adapted to the assembly. The carriage 15 is adapted to be moved by two cables 83 and 84 attached at either end of the frame 16. The cables 83—84 may be a single cable or two separate cables driven by a suitable electric or steam engine to position the carriage 15 along the rails 14 and to reverse its motion when necessary. The cylinders 52 and 51 can be suitably controlled by a single reversing valve which will supply fluid to either of the cylinders 51—52 as desired, to thereby position the rack 49 between the frame 48. The cylinder assembly 71 may also be controlled by a suitable two way valve which can be selectively operated to supply fluid to one or the other end of the cylinder assembly 71. This will result in one of the arbors 55 or 56 being placed in its operating position about the axis of pivot shaft 50. The discharge conveyor 43 will be driven by a motor on carriage 15 with the upper flight of conveyor 43 being driven in the direction shown by arrow 85 in FIGURE 1. The speed of the discharge conveyor 43 should be greater than the translational speed of the carriage 15 during its return. The receiving conveyor 79 is also driven by conventional means.

The operation of this machine is quite simple. It produces dimension lumber in a single step. The machine shown in the drawings is designed to produce studs, although the concepts of this invention may be used to produce any desirable lumber size and may be utilized to produce various sizes on a single machine. The two by fours which are to be produced in the preferred embodiment of this invention will have a single length which will be the length of the log 86, carried on the dog assembly 37. The log 86 will be precut and the bark removed from the log. The log will then be loaded onto the dog assembly 37 from the side by a conventional loading mechanism (not shown). The log will begin its travel at a position slightly to the left of the position of carriage 15 shown in FIGURE 1. The first slab will be removed from the log by running it through the horizontal band saw 72 with both arbors 55 and 56 in the position shown in FIGURE 1.

Figure 9:
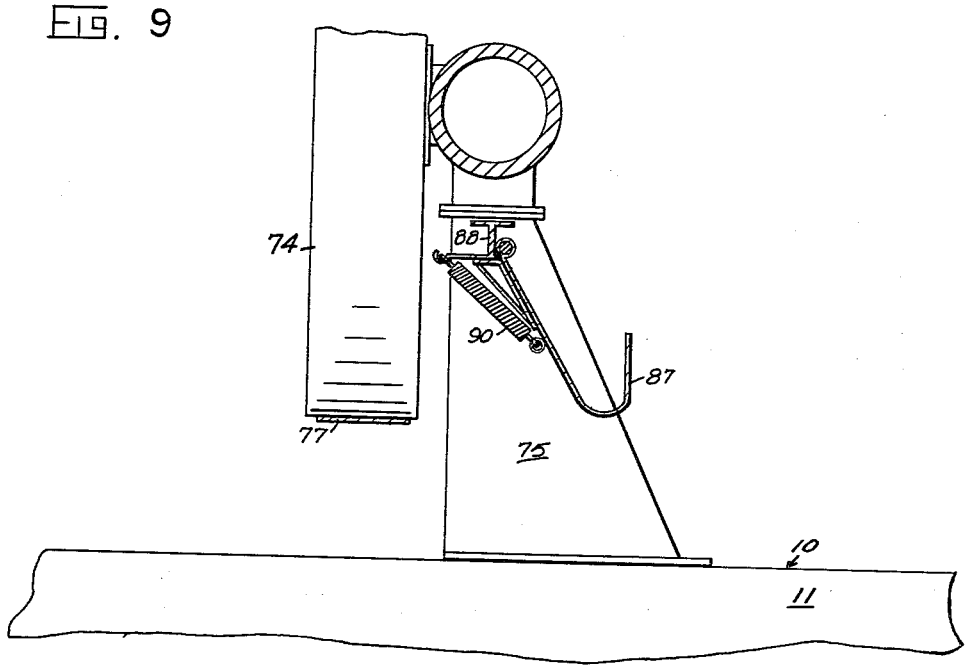
FIGURE 9 is an enlarged side view taken generally along line 9—9 in FIGURE 8.

The entire machine will be controlled by a sawyer located in a control station positioned directly above and to the left as seen in FIGURE 1 of the edger assembly 47. From this position the sawyer may view the log and decide how the log is to be cut during each pass of the carriage 15 through the machine. To cut two by fours with the narrow edge in a horizontal plane, he will select the control which will lower the arbor 56 and which will raise the racks 24 a distance of four inches. Such controls are available in conventional mill machinery today and can be automatically selected by pushing a single control button. The selection of the cut should also automatically begin operation of the movement of carriage 15. The carriage will then move to the right as seen in FIGURE 1, and will carry the log 86 under the lowered arbor 56. The saws 59 on arbor 56 will cut vertical grooves or kerfs along the top surface of the log 86. As the log 86 progresses the lower cutting blade 77 of the band saw 72 will cut the log 86 in a horizontal plane directly at the bottom of the kerfs. The log 86 will continue to the right in FIGURE 1, until the saw 72 completes the horizontal cut. At this time a pivoted stop member 87 (FIGURE 9), which is mounted on a fixed arm 88 between the two pedestals 75, will lower behind the rear end of the cut lumber. The stop 87 is biased downwardly by spring 90. The stop 87 is designed to allow movement of the lumber to the right in FIGURES 1 and 10, but will abut the rear edge of the lumber and prevent its movement to the left. After the log has passed the position of stop 87, the movement of carriage 15 will be reversed. This will cause the log 86 to be moved to the left, as seen in FIGURE 1, but the cut boards will remain stationary since they will abut the stop 87. As the log 86 moves, the cut board will slide over its top surface. Eventually the board will tip from the top of the log 86 over its forward end and will fall on the discharge conveyor 43. At this time the position of the conveyor 43 will be such that its right hand end, seen in FIGURE 1, will be adjacent the left hand end of the receiving conveyor 79. Due to the increased speed of conveyor 43 relative to the reverse speed of carriage 15, the boards will be flung from the conveyor 43 onto the receiving conveyor 79 where they are carried to the subsequent mill operations. The log 86 will continue to the left in FIGURE 1, until it reaches the initial position. During this return motion of the carriage 15, the sawyer may choose his next cut and will make the appropriate selections on the conventional set works controls. The studs may be cut in either a horizontal or vertical position by selection of either arbor 55 or 56 as the cutting arbor for the particular cut. Depending upon which arbor 55 or 56 is chosen, the pinions 25 will raise the racks 24 an appropriate distance corresponding to the orientation of the lumber being cut. Thus when the arbor 56 is chosen to cut two inches along the horizontal, the racks 24 will be raised four inches. If arbor 55 is chosen the racks 24 will be raised only two inches. This interrelation between the controls must be extremely accurate in order that the saws 59 and 72 will cut the log at the precise spot desired. However, since the cutting is all done from the top of the log and no initial squaring of the sides is necessary, the time saved by this present operation is quite evident. When the log is cut to the center it is scarfed on the return stroke and is then turned over by the loading mechanism for the remainder of the cuts. Thus on the last stroke two courses of cut pieces are delivered, one above the horizontal saw and one below it.

It is apparent therefore that the present invention contemplates a machine wherein logs are fed into the machine and cut lumber is delivered from its output end. The controls necessary for the machine may be varied, depending upon the particular installation. The preciseness of the controls can be guaranteed by modern methods. Various modifications may be evident to one skilled in this art after a study of the above description. For this reason the description of the preferred embodiment of the machine is not to limit the scope of this invention except as the invention is defined in the following claims.

Having thus described my invention, I claim:

1. A single pass log sawing machine comprising:
   a fixed framework;
   carriage means including a rigid carriage frame mounted on said framework for translational movement in a longitudinal direction, and log engaging means mounted on said carriage frame adapted to securely grip a log in a longitudinal position on said carriage frame, said log engaging means being vertically adjustable relative to said carriage frame, the top portion of a log engaged by said log engaging means being exposed;
   a discharge conveyor mounted in a fixed position on said carriage frame forward of said log engaging means and longitudinally aligned with the longitudinal axis of a log held by said log engaging means, said discharge conveyor having a powered upper flight moving in a forward direction;
   edger saw means mounted on said framework above the elevation of the carriage means and including a plurality of transversely spaced vertical rotary saws longitudinally aligned with a log held by said log engaging means, said saws having a work engaging position at which the lowermost edges of said saws are at an elevation below that of the top surface of a log held in said log engaging means;
   horizontal band saw means mounted on said framework adjacent the forward edge of said edger saw means, said band saw including a plane lower blade having rearwardly projected saw teeth, the elevation of said lower blade being identical to the elevation of said lowermost edges of the rotary saws in their work engaging positions;
   movable stop means positioned on said framework adjacent the forward edge of said lower blade of said band saw means, said stop means being adapted to abut the rear ends of cut lumber located forwardly of said band saw means above the elevation of said lower blade;
   and drive means operatively connected to said carriage means adapted to reciprocate it from a first position wherein a log held by said log engaging means is located rearward of said edger saw means to a second position wherein the log is located forward of said movable stop means and finally to return said carriage means to said first position.

2. The device as defined in claim 1 further comprising:
   power operated means mounted on said carriage frame and operatively connected to said log engaging means, said power operated means being adapted to vertically position said log engaging means as a unit relative to said carriage frame.

3. The device as defined in claim 1 wherein said log engaging means comprises:
   a vertically movable rigid structure mounted on said carriage frame;
   longitudinally spaced transverse horizontal dog assemblies mounted at the top of said structure, each of said dog assemblies including a pair of transversely movable inwardly facing dogs having lower wedged surfaces, and power means on the structure operatively connected to each pair of said dogs adapted to simultaneously move the dogs of each pair toward one another to thereby grip the lower outside surface of a log placed on the structure.

4. The device as defined in claim 1 wherein said edger saw means comprises:
   a rack pivotally mounted on said framework about a transverse axis located above the carriage means;
   a pair of arbors rotatably journalled on said rack about spaced transverse axes, said arbors serving as the mounting units for said vertical saws;
   and means on said framework operatively connected to said rack adapted to pivot said rack about its transverse axis to thereby place one of said arbors in an elevational position wherein the saws on said one arbor are in their work engaging position.

5. A single pass log sawing machine comprising:
   a fixed framework including parallel longitudinal rails;
   a carriage having wheels mounted on said rails and supporting a vertically fixed carriage frame, a dog structure mounted on said carriage frame for vertical movement relative to said frame, and dog means on the structure adapted to center and grip a log placed longitudinally thereon;
   a longitudinal discharge conveyor mounted on the carriage frame in a fixed horizontal position, having a top surface moving in a direction perpendicular to the motion of said dog structure, said dog structure and said discharge conveyor being longitudinally aligned;
   an edger saw assembly mounted on said framework in alignment with the center of said dog structure at an elevation above the carriage, said edger saw assembly including an arbor rotatably mounted thereon for movement about a transverse horizontal axis and saw means mounted thereon adapted to cut parallel kerfs in a log carried by said dog structure;

a horizontal band saw mounted on said framework adjacent said saw means, said band saw having a plane lower cutting blade adapted to cut a log as it emerges from the edger saw assembly;

and movable stop means mounted on said framework adapted to prevent return of cut boards emerging from the band saw.

6. A single pass log sawing machine comprising:

a fixed framework;

carriage means including a carriage frame mounted on said framework for translational movement in a longitudinal direction, and log engaging means mounted on said carriage frame adapted to hold a log in a horizontal position on said carriage frame, said log engaging means being vertically adjustable relative to said carriage frame, the top portion of a log held by said log engaging means being exposed;

a discharge conveyor mounted on said carriage frame forward of said log engaging means and longitudinally aligned with the longitudinal axis of a log held by said log engaging means, said discharge conveyor having its upper flight moving in a forward direction;

edger saw means mounted on said framework above the elevation of said carriage means and including a plurality of transversely spaced vertical saws longitudinally aligned with a log held by said log engaging means, said saws having a work engaging position at which the lowermost cutting levels of said saws are at an elevation below that of the top surface of a log held in said log engaging means;

horizontal saw means mounted on said framework in front of said edger saw means, said horizontal saw means being positioned at the elevation of said lowermost cutting levels of the vertical saws in their work engaging positions, and including a plane lower blade having rearwardly projected saw teeth;

movable stop means positioned on said framework forward of said horizontal saw means, said stop means being adapted to abut the rear ends of cut lumber located forwardly of said horizontal saw means above the elevation thereof;

and drive means operatively connected to said carriage means adapted to reciprocate it from a first position wherein a log held by said log engaging means is located rearward of said edger saw means to a second position wherein the log is located forward of said movable stop means and finally to return said carriage means to said first position.

References Cited in the file of this patent

UNITED STATES PATENTS

| | | |
|---|---|---|
| 799,546 | Dittbenner | Sept. 12, 1905 |
| 836,117 | Kennedy | Nov. 20, 1906 |
| 927,248 | Kennedy | July 6, 1909 |
| 1,132,129 | Stevens | Mar. 16, 1915 |
| 1,344,096 | Sprague | June 22, 1920 |
| 1,551,964 | Mitchell | Sept. 1, 1925 |
| 2,612,914 | Reynolds | Oct. 7, 1952 |
| 2,787,365 | Hutchinson | Apr. 2, 1957 |

FOREIGN PATENTS

| | | |
|---|---|---|
| 787,724 | Great Britain | Dec. 11, 1957 |